US008043578B2

(12) United States Patent
Vetter

(10) Patent No.: US 8,043,578 B2
(45) Date of Patent: Oct. 25, 2011

(54) FLEXIBLE PRESSURE CONTAINING SHAPED COVERPLATE CONFIGURATION

(75) Inventor: Michael J. Vetter, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 341 days.

(21) Appl. No.: 12/388,013

(22) Filed: Feb. 18, 2009

(65) Prior Publication Data

US 2010/0209317 A1   Aug. 19, 2010

(51) Int. Cl.
*B01J 8/02* (2006.01)
*B01J 35/02* (2006.01)
*B01J 8/08* (2006.01)
*B01J 19/00* (2006.01)
*B01J 8/18* (2006.01)
*F27B 15/00* (2006.01)
*F27B 15/08* (2006.01)

(52) U.S. Cl. ........ 422/218; 422/216; 422/217; 422/219; 422/220; 422/221; 422/129; 422/139; 422/140; 422/143; 422/145

(58) Field of Classification Search .................. 422/211, 422/216–221, 129, 139, 140, 143, 145
See application file for complete search history.

(56) References Cited

U.S. PATENT DOCUMENTS

| 3,909,208 | A | * | 9/1975 | Boret et al. | 422/218 |
| 5,358,698 | A | * | 10/1994 | Butler et al. | 422/218 |
| 5,405,586 | A | | 4/1995 | Koves | |
| 5,423,984 | A | * | 6/1995 | Belden | 210/232 |
| 6,569,389 | B1 | | 5/2003 | Koves et al. | 422/219 |
| 7,268,265 | B1 | | 9/2007 | Stewart et al. | 585/324 |
| 7,317,133 | B2 | | 1/2008 | Vora et al. | 585/327 |
| 2002/0164278 | A1 | | 11/2002 | Vetter et al. | |
| 2004/0091404 | A1 | | 5/2004 | Ablin | |
| 2008/0075643 | A1 | | 3/2008 | Lv | |
| 2008/0107575 | A1 | | 5/2008 | Vetter et al. | |

OTHER PUBLICATIONS

International Search Report & Written Opinion dated Jul. 20, 2010, PCT/US2009/067413, International Filing Date Dec. 10, 2009.

* cited by examiner

*Primary Examiner* — Walter Griffin
*Assistant Examiner* — Natasha Young
(74) *Attorney, Agent, or Firm* — Arthur E Gooding

(57) ABSTRACT

A flexible pressure containment coverplate has been invented for radial flow reactors. The coverplate is for a fixed bed reactor wherein the reactor undergoes significant thermal cycles. The coverplate provides flexibility for axial and radial thermal growth, while providing a sealing capability to prevent leakage of the fluid. The coverplate has a half toroidal structure, with a semi-circular cross-section.

14 Claims, 1 Drawing Sheet

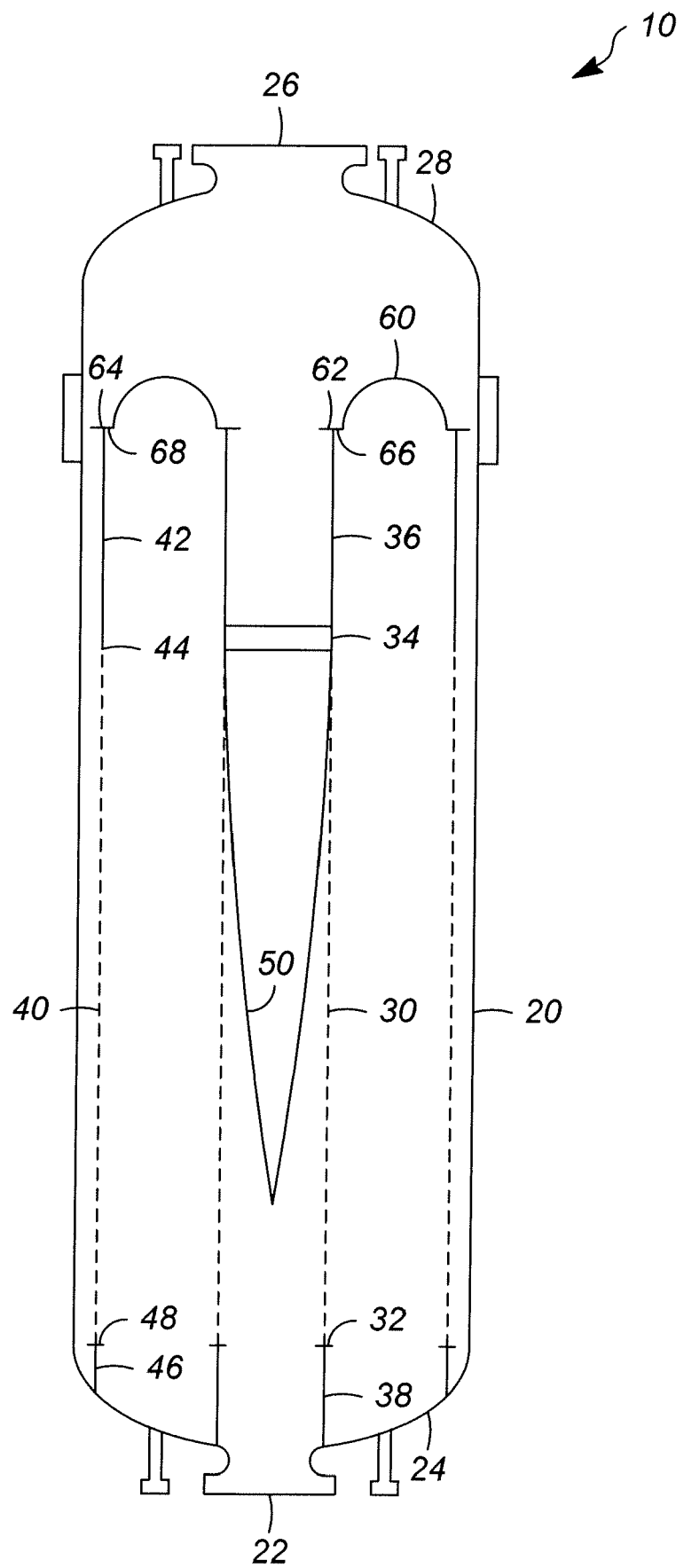

FLEXIBLE PRESSURE CONTAINING SHAPED COVERPLATE CONFIGURATION

FIELD OF THE INVENTION

This invention relates to the field of fluid particle contacting. In specific the field is for a hydrocarbon stream contacting a fixed bed of solid catalyst particles for the purpose of olefin cracking.

BACKGROUND OF THE INVENTION

The olefin cracking process comprises contacting an olefin rich stream with a solid catalyst to crack larger olefins into light olefins. The process increases the yields of ethylene and propylene from processes that generate butenes, pentenes and larger olefins. The olefin cracking process utilizes a radial flow reactor design wherein the olefin rich gas flows radially, or horizontally, over a fixed bed of catalyst. The olefin cracking reactor uses a downflow seal design requiring a coverplate configuration. The coverplate connects the inner and outer screens of the radial flow reactor. This configuration enables vapor containment in a low amplitude-high frequency thermal cyclic operation. The flow of the gas over the reactor bed generates a pressure differential across the coverplate. The conventional coverplate couples the inner and outer screens which experience frequent axial and radial differential thermal growth. The pressure differential combined with the cyclic thermal operation creates potential leakage opportunities where the leakage of the seal flow has the equivalent effect of a feed bypass. The pressure differential containment requires reinforcement of the components that grow and interact with the frequent thermal cyclic operation.

This has led to the development of reinforcement of the components, such that the system is stiff, or rigid, enough to translate relative differential growth. The system is combined with numerous component interfaces that are sized with clearances which require numerous slip joint and overlapping type connections. These connections are then packed with materials for sealing the system. The conventional system requires the interaction of numerous components at multiple interfaces, and presents the opportunity for mechanical failure and subsequent leakage, resulting in significant losses.

SUMMARY OF THE INVENTION

The present invention provides for a simpler and less expensive design with a reduced chance of failure, thereby reducing leakage and loss of product. The invention is for a fixed bed reactor with a cross flowing fluid. The fluid is typically a gas. The invention is an apparatus that includes a vertically oriented vessel having a fluid inlet and a fluid outlet. A fluid flows into a centerpipe having a centerpipe radius and is disposed within the vessel, and where the vessel fluid inlet is in fluid communication with a first end of the centerpipe. The centerpipe is made of a perforated material for allowing the fluid to flow across the centerpipe wall, and the centerpipe includes a second end that is restricted to limit flow of fluid, or closed completely to force the fluid through the perforated centerpipe wall. A plug distributor is affixed to the second end of the centerpipe to facilitate a uniform flow of fluid across the centerpipe wall. The apparatus further includes a cylindrical screen with a radius greater than the centerpipe radius and surrounds the centerpipe. The space between the cylindrical screen and the centerpipe is filled with a solid particulate catalyst and forms a catalyst bed. The catalyst bed is sealed at the bottom of the vessel by sealing contact of the centerpipe and screen with the vessel bottom. A toroidal cap is sealingly affixed to the top of the centerpipe and the top of the screen to connect the centerpipe to the screen and to enclose the catalyst bed.

Other objects, advantages and applications of the present invention will become apparent to those skilled in the art from the following detailed description and drawings.

BRIEF DESCRIPTION OF THE DRAWING

The FIGURE is a schematic of a radial flow reactor used in the olefin cracking process, including the shaped coverplate designed to allow for differential movement of the inner and outer screens of the reactor.

DETAILED DESCRIPTION OF THE INVENTION

A new coverplate design is needed to improve the overall performance, and to overcome the deficiencies of the current design that allows for the development of leaks. A new coverplate configuration has been designed that is flexible enough to handle the frequent thermal cycles for the differential growth of the inner and outer screens, and having sufficient strength to contain the differential pressure. The containment of the vapor has been a long term problem, and that the approach has been to continually add more seals and stiffeners to the coverplate to overcome leakage.

The present invention comprises an apparatus for fluid-solid contacting comprising a vertically oriented, substantially cylindrical vessel having a vessel wall, and a fluid inlet and fluid outlet. The vessel also includes a vessel bottom and a vessel top, comprising elliptically shaped ends affixed to the cylindrical vessel ends. The apparatus further includes a vertically oriented centerpipe having a centerpipe radius and disposed within the vessel. The centerpipe has a first end in fluid communication with the fluid inlet, and a second end, and the centerpipe has a plurality of apertures distributed over the surface of the centerpipe wall. The centerpipe is also called the inner screen and has a top centerpipe edge and a bottom centerpipe edge. The apparatus further includes a vertically oriented cylindrical screen having a radius greater than the centerpipe radius, with the screen disposed between the centerpipe and the vessel wall. The cylindrical screen is also called the outer screen and has a top screen edge and a bottom screen edge. The cylindrical screen surrounds the centerpipe, and a volume is defined between the screen and centerpipe for holding a bed of solid particulate material. The screen has a plurality of apertures distributed over the screen and sized to contain the solid particles, while allowing fluid to flow across the screen. The apparatus further includes a plug distributor disposed within the centerpipe, and affixed to the centerpipe top edge. The plug distributor has a conical shape, or a piecewise conical shape, and is tapered to a closed end. The apparatus further includes a toroidal cap having an inner edge connecting to the centerpipe, and an outer edge connecting to the screen. The toroidal cap provides a flexible containment coverplate for radial flow reactors.

For a cross-flow reactor, one type of screen is a profile wire screen, where a profile wire is wrapped around supports and set at a predetermined spacing for the wire as the wire is wrapped around the supports. The profile wires are positioned to face into the bed of solid particulate material. A profile wire has a generally triangular cross-sectional shape where one of the cusps is bonded to a support, and the flattened portion of the wire opposite the bonded cusp presents a flat shape for solid particles to rest against, or even to slide along. The screen then comprises a plurality of openings, or apertures, where in one direction the profile wires are aligned, and in a transverse direction the supports are aligned. Usually, the screen is then cut and flattened and then re-rolled or re-shaped to align the profile wires in an axial direction. A screen using the profile wires is shown in U.S. Pat. Nos. 2,046,458 and 4,276,265. The profile wire screen design can also be used for the centerpipe. The centerpipe is also a screen having a smaller internal radius to form the inner boundary of the catalyst bed.

FIG. 1 is a schematic of an olefin cracking reactor including the present invention. The reactor 10 comprises a vertically oriented vessel 20 having an inlet port 22 disposed in the bottom end 24 of the vessel 20 and an outlet port 26 disposed in the upper end 28 of the vessel 20. The reactor 20 includes an inner centerpipe 30 having a centerpipe radius and having a first end 32 in fluid communication with the vessel inlet 22 and a second end 34, and where the centerpipe 30 comprises a perforated structure providing apertures for fluid to flow across the centerpipe 30. A vertically oriented cylindrical screen 40 having a radius greater than the centerpipe radius is disposed between the centerpipe 30 and the vessel 20. A plug distributor 50 is disposed with in the centerpipe 30 and is affixed to the second end 34 of the centerpipe 30 provides for distributing fluid in a substantially uniform manner across the perforated surface of the centerpipe 30. The plug distributor 50 takes up volume in the centerpipe 30 and thereby reduces the hot residence time, and thereby reduces non-selective thermal cracking of the feed. The reactor 10 further includes a toroidal cap 60 sealingly affixed to the top of the centerpipe 30 and the top of the cylindrical screen 40.

The toroidal cap 60 comprises a half of a torus having a half elliptical cross-section. The half elliptical cross-section of the torus can be between 0 and 0.9, preferably between 0 and 0.5, with a most preferred cross-section being a semicircular cross-section, or an eccentricity of 0. A semicircular cross-section provides the greatest strength for a thin gauge metal. The choice of cross-section can depend on the material used, and the thickness of the metal used for the toroidal cap 60. The thickness of the metal maintains the seal by containing the pressure differential. The toroidal cap can have a thickness between approximately 1 mm to 5 mm, or the use of sheet metal for stainless steel having a gauge thickness from approximately 18 gauge to 6 gauge, with a preferred choice of 10 gauge, or approximately 3.57 mm thick. The toroidal cap 60 is made of a continuous piece of sheet metal to provide the best integrity against potential leakage. The choice of a semicircular cross-section provides the greatest strength without the need for reinforcing structural members to stiffen the cap. Although overall operating conditions can allow for half elliptical-sections having an eccentricity greater than 0. The half-toroidal shape with a semicircular cross-section is optimum for pressure containment, and using a thin sheet allows for flexibility of the cap when coupled with the differential thermal growths of the inner centerpipe and the outer screen, and also allows for changes in the radial direction.

In one embodiment, the apparatus further includes blankoffs for enclosing and restricting the fluid flow across portions of the catalyst bed. The apparatus includes a blankoff 36 disposed between the upper end 34, or second end, of the centerpipe 30 and the inner edge 66 of the toroidal cap 60, and a blankoff 42 disposed between the upper edge 44 of the cylindrical screen 40 and the outer edge 68 of the toroidal cap 60. The apparatus further can include a centerpipe lower blankoff 38 disposed between the first end 32 of the centerpipe 30 and the inlet port 22 of the vessel 20, and a cylindrical screen lower blankoff 46 disposed between the screen bottom edge 48 and the vessel bottom 24.

The toroidal cap 60 can further include an inner diameter connector 62 affixed to the cap 60 and an outer diameter connector 64 affixed to the cap, or molded from a single piece of metal, such as can be formed with a sheet metal press, or other means known to those skilled in the art of metal working. The connectors 62, 64 are flared contour connectors to provide a better fit with the connections to the centerpipe 30 and the outer cylindrical screen 40. The flared connectors 62, 64 are flanges that can be readily bolted to flanges on the centerpipe and the outer screen, or the respective blankoffs 36, 42, for convenience and reliability of seals.

Typically, the flared contour connectors 62, 64 are flanges that provide for bolting, or otherwise releaseably affixed to flanges on the centerpipe 30 and screen 40, or to flanges affixed to the upper blankoffs 36, 42 of the centerpipe 30 and screen 40.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An apparatus for fluid-solid contacting comprising:
    a vertically oriented, substantially cylindrical vessel having a vessel wall, a fluid inlet and a fluid outlet;
    a vertically oriented centerpipe having a centerpipe radius and disposed within the vessel and having a first end, a second end and a centerpipe wall, wherein the first end is a fluid inlet and is in fluid communication with the vessel fluid inlet, and the fluid outlet comprises apertures in the centerpipe wall;
    a vertically oriented cylindrical screen having a radius greater than the centerpipe radius, a screen top edge and a screen bottom edge and disposed between the centerpipe and the vessel wall, and spaced a distance from the centerpipe wall, wherein the screen comprises apertures to allow fluid to flow across;
    a plug distributor disposed within the centerpipe and affixed to centerpipe second end;
    a centerpipe upper blankoff disposed between the second end of the centerpipe and a toroidal cap;
    a screen upper blankoff disposed between the screen top edge and the toroidal cap; and
    the toroidal cap sealingly connecting the top of the centerpipe upper blankoff with the top of the screen upper blankoff.

2. The apparatus of claim 1 wherein the vessel has a vessel bottom, further comprising:
    a centerpipe lower blankoff disposed between the first end of the centerpipe and the vessel bottom; and
    a screen lower blankoff disposed between the screen bottom edge and the vessel bottom.

3. The apparatus of claim 1 wherein the toroidal cap comprises a half of a torus having a half elliptical cross section.

4. The apparatus of claim 3 wherein the half elliptical cross section has an eccentricity of between 0 and 0.9.

5. The apparatus of claim 4 wherein the half elliptical section has an eccentricity of between 0 and 0.5.

6. The apparatus of claim 1 wherein the toroidal cap comprises a half of a torus having a semicircular cross section.

7. The apparatus of claim 1 wherein the toroidal cap is made of thin gauge material.

8. The apparatus of claim 1 wherein the toroidal cap is made of a continuous piece of material.

9. The apparatus of claim 1 wherein the toroidal cap has an inner diameter connector and an outer diameter connector, and has flared contoured connectors at the inner diameter and outer diameter connectors.

10. An apparatus for fluid-solid contacting comprising:
- a vertically oriented, substantially cylindrical vessel having a vessel wall, a fluid inlet and a fluid outlet;
- a vertically oriented centerpipe having a centerpipe radius and disposed within the vessel and having a first end, a second end and a centerpipe wall, wherein the first end is a fluid inlet and is in fluid communication with the vessel fluid inlet, and the fluid outlet comprises apertures in the centerpipe wall;
- a vertically oriented cylindrical screen having a radius greater than the centerpipe radius, a screen top edge and a screen bottom edge and disposed between the centerpipe and the vessel wall, and spaced a distance from the centerpipe wall, wherein the screen comprises apertures to allow fluid to flow across; and
- a toroidal cap sealingly connecting the top of the centerpipe with the top of the screen, wherein the toroidal cap comprises a half of a torus having a semicircular cross section.

11. The apparatus of claim 10 further comprising a plug distributor disposed within the centerpipe and affixed to centerpipe second end.

12. The apparatus of claim 10 wherein the toroidal cap is made of thin gauge material.

13. The apparatus of claim 10 wherein the toroidal cap is made of a continuous piece of material.

14. The apparatus of claim 10 wherein the toroidal cap has an inner diameter connector and an outer diameter connector, and has flared contoured connectors at the inner diameter and outer diameter connectors.

\* \* \* \* \*